Herbert H. Moor Inventor
By P. H. Young Attorney

Herbert H. Moor Inventor
By ??? Young Attorney

Patented Aug. 24, 1943

2,327,543

UNITED STATES PATENT OFFICE 2,327,543

ROTARY FILTER

Herbert H. Moor, Moore Township, Lambton County, Ontario, Canada, assignor to Standard Oil Development Company, a corporation of Delaware Application December 28, 1939, Serial No. 311,334

4 Claims. (Cl. 210—202)

The present invention relates to a method and apparatus for the filtration of liquid materials. More particularly, the invention relates to a method and apparatus for removing solid or solidifiable materials contained in a liquid medium, as wax from hydrocarbon oils, and from mixtures with other liquids. Specifically, the invention relates to a rotary vacuum filter and means for preventing contamination of filtrate therefrom.

It is a particular object of the invention to provide, in combination with a rotary vacuum filter, a means by which solvent materials, used in the washing of a filter cake, are prevented from diluting or contaminating the filtrate obtained by the filter operation.

Figure 1:
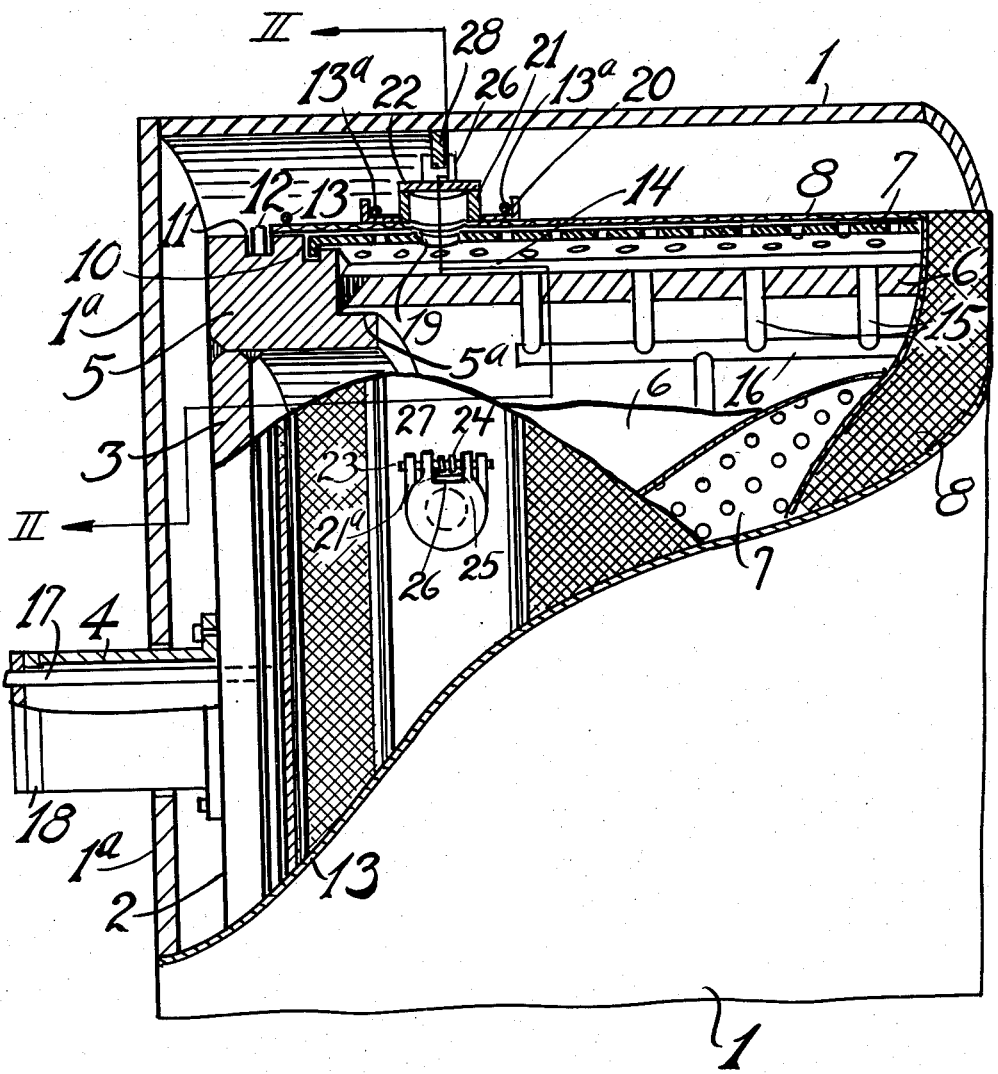
Figure 2:
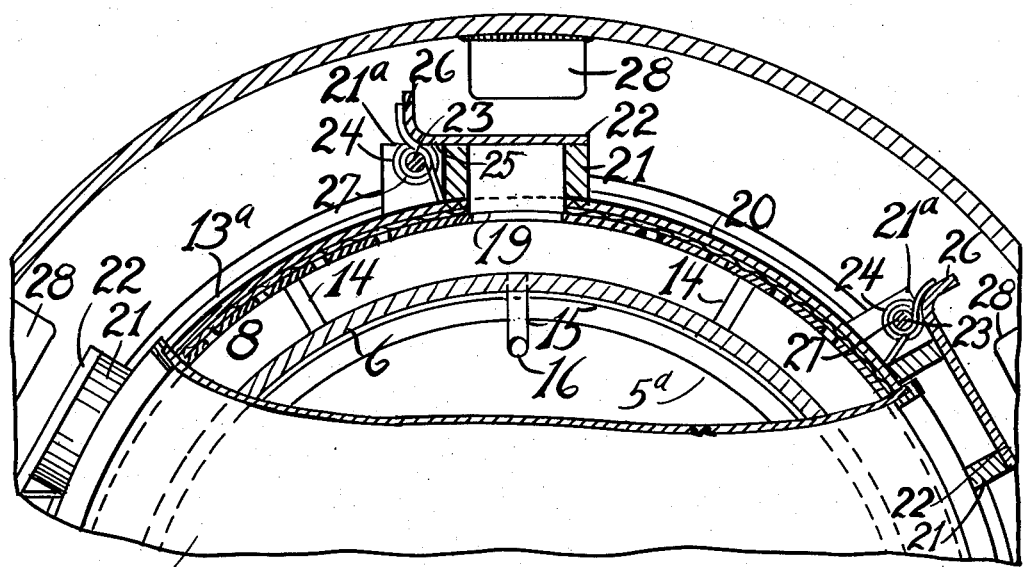
Figure 3:
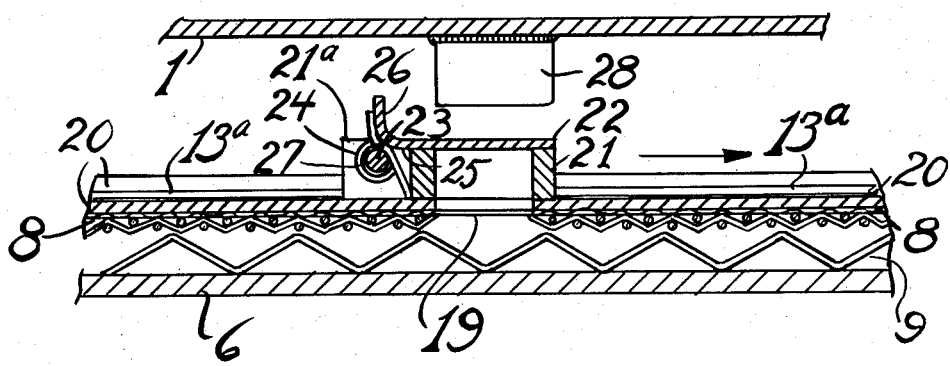

This and other objects of the invention may be fully understood from the following specification when it is read in conjunction with the accompanying drawings, in which Fig. 1 is a view in perspective of a portion of a rotary filter, with parts broken away;

Fig. 2 is an end elevation of a portion of the filter, partly in section, taken along the line II—II of Fig. 1; and Fig. 3 is a vertical section through a portion of the filter drum showing an alternate form of construction.

As illustrated, the numeral 1 designates the outer case of a rotary filter apparatus of substantially conventional design. Within the case 1 is disposed a filter drum 2, provided with an end portion 3, to which is secured a hollow trunnion or stub shaft 4, the shaft end extending through a suitable opening in the end plate 1a of the filter 1. At the periphery of the end portion 3 is secured a flanged rim member 5, the stepped flange 5a extending inwardly of the member. A cylindrical filter shell 6 is fixedly secured to the lowermost step portion of the flange 5a, and in succession outwardly therefrom are disposed a cylindrical filter blanket support 7 and the blanket of filter cloth 8. The support 7 which may be a perforate plate or a heavy wire screen, is disposed in spaced relation to the shell 6, providing an annular chamber around the drum. If a wire screen is substituted for the perforate plate member 7, as in Fig. 3, it is desirable to provide supplementary support for the screen, as by a bent wire spacer 9 as shown in Fig. 3. The support 7 and the filter blanket 8 are secured to the stepped flange 5a in any convenient fashion, one means being illustrated in which the end of the plate 7 is turned inward to provide a flange engageable in an annular groove 10, and the filter blanket 8 is held in an annular groove 11 by means of a friction ring 12 and a wire binding ring 13.

The annular chamber formed between the shell 6 and the support 7 is divided into a plurality of compartments, extending longitudinally of the drum, by means of the spaced partition members 14. These members may be secured to the shell 6 or otherwise fixedly disposed with relation thereto, and also aid in supporting the plate or screen member 7. Each of the compartments thus formed is provided for drainage by means of conduits 15 opening through the shell 6 and communicating with a header 16, which is in turn connected to a line 17 extending outwardly through the trunnion, and is provided with a plate valve 18.

The apparatus thus far set forth is used in the continuous separation of suspensions or mixtures in liquids, of solid or solidifiable materials, and especially for dewaxing hydrocarbon oils. Suction applied through the lines 17, 16 and 15 as the drum is immersed in a liquid containing such materials, causes them to be deposited on the filter blanket while the filtered liquid or filtrate is drawn through the blanket into the several compartments and outwardly from the drum. In order to complete the separation of filtrate from the filter cake contained on the blanket, the liquid to be filtered is maintained at an intermediate level in the filter case 1, and during the upper portion of the revolution of the drum, the filter cake is washed with a solvent for the filtrate which displaces the filtrate from the cake.

It has been found that in this operation the solvent material is also drawn through the filter cake into the filtrate collection lines, diluting the filtrate to an excessive degree. For example, in a typical rotary vacuum filter eight feet in diameter and fourteen feet long, there will be about twenty-four compartments, each with its connecting lines, having a capacity of about 7.56 gallons. A typical charge to such a filter might be about 100 barrels per hour of filterable material, of which about 87 barrels would be filtrate. In such an operation, about 60 barrels per hour of wash solvent might be used. Assuming a speed of rotation for the drum 2 of about 2.5 minutes per revolution, each compartment would pass approximately 6.6 gallons of filtrate and 4.55 gallons of wash solvent. As each section retains 7.56 gallons of liquid, dilution of filtrate with spent solvent readily occurs, resulting in extremely poor separation between filtrate and spent wash solvent, and where the spent solvent is to be used to dilute fresh feed, considerable filtrate is recycled also.

In order to minimize the problem of dilution, it is proposed to release suction on the space or compartments below the filter blanket during a portion of that period of rotation of the drum during which the wash solvent is applied. The most convenient way of accomplishing this is to admit gas from within the filter case, as soon as the filtrate has been displaced from the filter cake, and before the wash solvent begins to enter the compartments or collection lines communicating therewith.

For this purpose, the apparatus set forth above is provided with automatically operated valve means, as shown. Peripherally of the drum 2, adjacent an end thereof, a plurality of valved ports 19 open through the blanket 8 and support 7, each port communicating with one of the compartments formed between the support 7 and the shell 6. To form the ports required, openings are cut through the blanket 8 and support 7 at spaced intervals peripherally of the drum. Over the area of the opening, an annular band 20 is securely strapped to the drum, the wire binding rings 13a aiding in maintaining a fixed relationship therebetween. Spaced openings in the band 20 correspond to and are disposed concentrically with the openings in the blanket 8 and support 7. A collar 21 is secured to the band about each of the openings and is provided with a hinged cover plate 22. Rearwardly extended wing portions 21a on the collar 21 provide supports for a hinge pin 23, which in turn passes through the hinge eyes 24 formed in the lip portion 25 on the cover plate 22. The center portion of the lip 25 is turned upwardly to form cam lever 26. A spring member 27 encircles the pin 23 between the ring portions 21a, one end of the spring engaging the collar 21 and the other end the lever 26, holding the cover plate 22 in fluid-tight engagement with the collar 21. A cam member 28 is secured to the filter case 1 at a point at which gas from the case is to be admitted, and the rotating drum will bring each lever into engagement with the cam in succession to open the cover and admit gas to each compartment in turn. Obviously, by using several cam members or by one of substantial length, any desired volume of gas may be admitted. In positioning the cam 28, the point at which the maximum quantity of filtrate has been displaced from the filter cake by wash solvent, should be determined and the cam so placed as to engage the cover plate cam lever to admit gas at about that point. The apparatus operates equally as well whether the differential pressure maintained across the filter surface is produced by pressure in the case, or suction through the filtrate removal lines.

Alternatively, the pressure differential across the filter surface may be equalized by introducing a gaseous material from outside the filter case into the space or compartments below the filter blanket. This may be accomplished in any suitable manner, as by a conduit system, similar to and duplicating the filtrate collection conduits, which enters the filter drum through the trunnion at the other end of the drum and is provided with a valve control for admission of gas, similar to the valve provided for withdrawal of filtrate.

Various modifications may be made in the system and apparatus without departing from the inventive concept disclosed, and it is not intended that the invention shall be limited to any disclosure made for the purpose of illustration, but only by the appended claims.

I claim:

1. A filter device, comprising a casing, a rotary filter element in said casing having a filter surface secured thereto, a plurality of ports opening through said surface, at spaced intervals, an annular clamp member engaging said surface at the ported area, having openings therein aligned concentrically with said ports, closure elements covering each opening, and means carried by the casing in the path of travel of the closures to open said closures at periodic intervals.

2. A filter device, comprising a casing, a rotary filter element in said casing having a filter surface secured thereto, a plurality of ports opening through said surface at spaced intervals, closures for the ports, and means carried by the casing in the path of travel of the closures to be engaged by and open said closures at periodic intervals.

3. In a continuous filtering process in which the filter cake is formed on a supporting filter medium by suction from a filtrate collection zone, the steps which comprises displacing the filtrate from the filter cake by suction, washing the filter cake, opening the collection zone to the atmosphere to release the suction at the time spent wash liquor is beginning to come through the filter medium and to permit displacement of the accumulation of filtrate in the collection zone, closing the collection zone to the atmosphere, and again applying suction to the zone so that the wash liquid enters the collection zone whereby contamination of the filtrate with the wash liquid filtrate is minimized.

4. A filter device comprising a casing, a rotary filter element in said casing having a filter surface secured thereto, a plurality of ports opening through said surface at spaced intervals, port closures carried by the filter element, means normally maintaining the closures in closed position, and actuating means disposed at the periphery of the filter surface in the path of travel of the closures operative to be engaged by and to open the closures at periodic intervals.

HERBERT H. MOOR.